July 3, 1923.

S. V. CORTÉS

AERIAL PROPELLING MACHINE

Filed April 9, 1920

WITNESSES
H. C. Hebig
Geo. W. Beck

INVENTOR
Salustio Valdés Cortés
BY
Munn & Co
ATTORNEYS

July 3, 1923.

S. V. CORTÉS 1,460,948

AERIAL PROPELLING MACHINE

Filed April 9, 1920

WITNESSES

INVENTOR
Salustio Valdés Cortés
BY Munn & Co
ATTORNEYS

Patented July 3, 1923.

1,460,948

UNITED STATES PATENT OFFICE.

SALUSTIO VALDÉS CORTÉS, OF VALPARAISO, CHILE.

AERIAL PROPELLING MACHINE.

Original application filed October 15, 1918, Serial No. 258,170. Divided and this application filed April 9, 1920. Serial No. 372,709.

*To all whom it may concern:*

Be it known that I, SALUSTIO VALDÉS CORTÉS, a citizen of the Republic of Chile, and a resident of the city of Valparaiso, at Number 268 Avenida del Brazil, Chile, have invented certain new and useful Improvements in Aerial Propelling Machines, of which the following is a full, clear, and exact description.

My invention relates to that type of rotary propelling mechanisms which are wholly immersed in the medium in which they are employed, and is a division of application Serial Number 258,170 filed October 15, 1918, patented Nov. 23, 1920, Patent No. 1,360,182.

The main object of the present invention is to provide a permeable casing with deflecting vanes for enclosing a rotary propelling mechanism and which can be adjusted by means of some suitable mechanism, in order to obtain an efficient utilization of the forces developed by the rotation of the propelling mechanism, and in the required direction.

The permeable casing of my invention is constituted with permeable sides and permeable periphery, and with deflecting vanes.

The sides and the periphery of the permeable casing are made permeable by means of open holes, in order that the mass of air can pass freely in and out of the permeable casing.

The permeable casing is provided with deflecting vanes, in order to obtain the required direction of the passage of the mass of air in and out of the permeable casing.

These deflecting vanes can be made fixed on the permeable casing or adjusted on it to be movable backwards, and forwards, by means of some suitable mechanism, in order to obtain the required control of the angle of deflection. It is obvious that the position of these deflecting vanes on the permeable casing depends principally upon the use of them on the permeable casing.

The permeable casing can be adjusted to enclose a rotary propelling mechanism, in a fixed position, or to be movable around it, by means of some suitable mechanism, in order to obtain the required control of the direction of the forces developed by the rotation of the said rotary propelling mechanism. It is obvious that the disposition of the permeable casing in an airship or any other vehicle with air propulsion, and its adjustment which can be either fixed, or turnable, depends principally on the use of the permeable casing.

The permeable casing, with its permeable sides and periphery, and with the deflecting vanes, constitutes the essential features of my invention, thus, characterizing and distinguishing it from all previous inventions.

An embodiment of the invention is illustrated in the accompanying drawing, in which.

Figure 1:
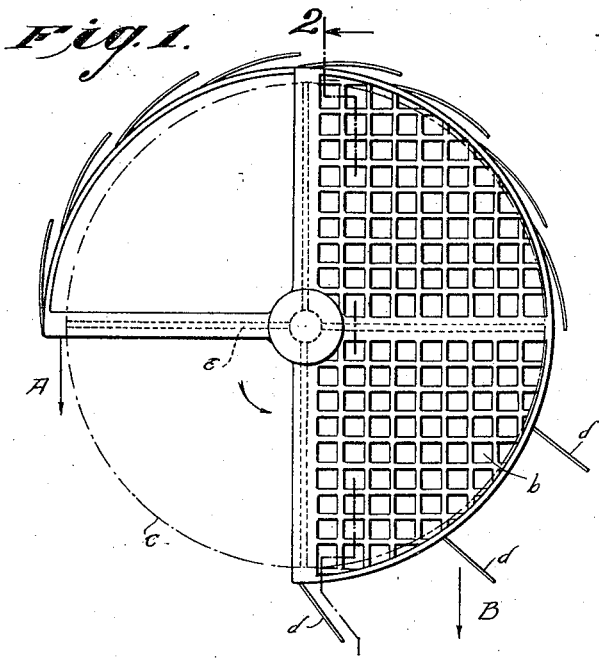
Figure 1 is a side view of a permeable casing with deflecting vanes on the periphery, enclosing one of the types of the rotary propelling mechanisms.
Figure 2:
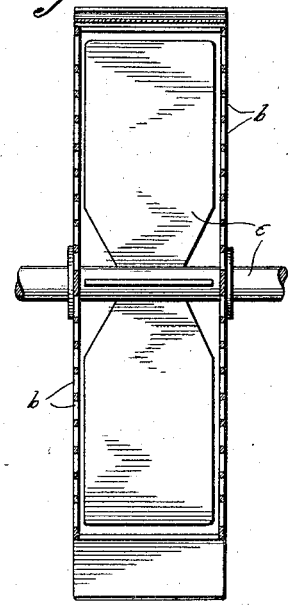
Fig. 2 is a vertical sectional view of the same.

By referring to Figs. 1 and 2, it can be seen how, in this case, the rotation of the enclosed propelling mechanism —e— in the direction shown by the arrow, produces the suction of air through the holes —b— from the sides of the permeable casing —a—, and discharges the revolving mass of air through the opening —c— of the periphery in the required direction.

In fact, thrusts in two main directions are obtained, (1) thrust A, and (2) thrust B. Thrust A is produced directly by the rotation of the propelling mechanism, while thrust B, is obtained by the impingement and deflection of the revolving air on the deflecting vanes —d— of the periphery.

Figure 3:
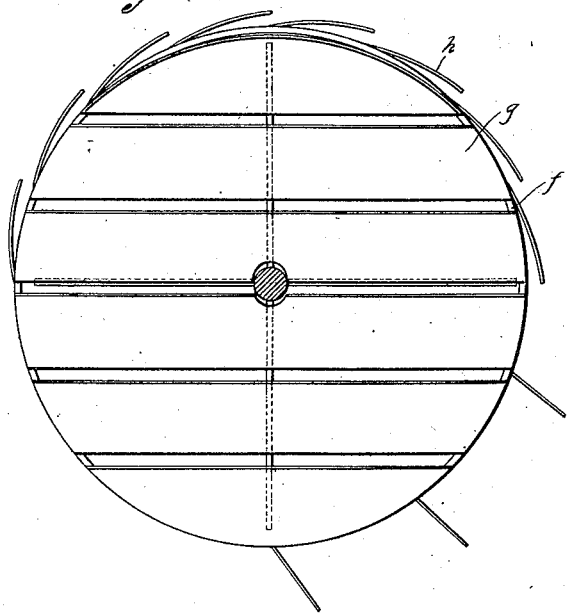
Fig. 3 is a side view of a permeable casing with deflecting vanes on its sides and on the periphery.
Figure 4:
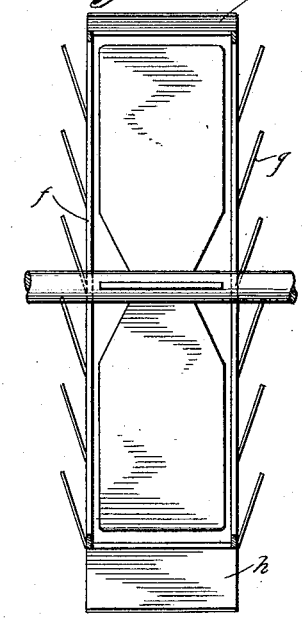
Fig. 4 is a vertical sectional view of the same.

Figs. 3 and 4 show a permeable casing —f— with deflecting vanes —g— on its sides and deflecting vanes —h— on the periphery.

Figure 5:
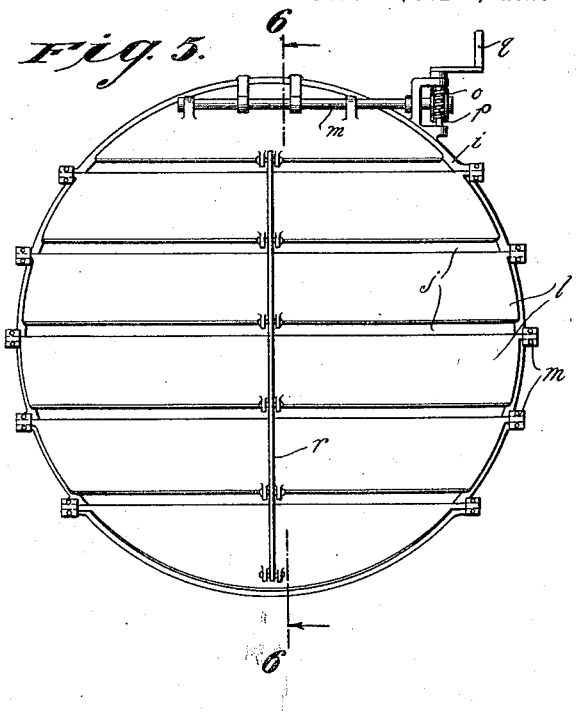
Fig. 5 is a side view of a permeable casing with movable deflecting vanes on one side only.
Figure 6:
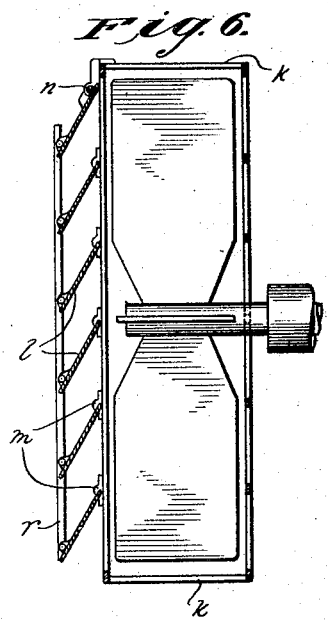
Fig. 6 is a vertical sectional view of the same.

Figs. 5 and 6 show a permeable casing —i— with holes —j— in its sides, holes —k— in the periphery and movable deflecting vanes —l— on one side only.

These deflecting vanes —l— are attached to the permeable casing —i— near the holes —j— by means of hinges —m—, and may be moved backwards and forwards by means of the rod —n—, the worm wheel —o—, the worm —*p*—, the handle —*q*—, and the connecting rod —*r*—.

It is evident that the deflecting vanes of the permeable casing can be adjusted to be moved backwards and forwards by means of any other suitable mechanism.

Figure 7:
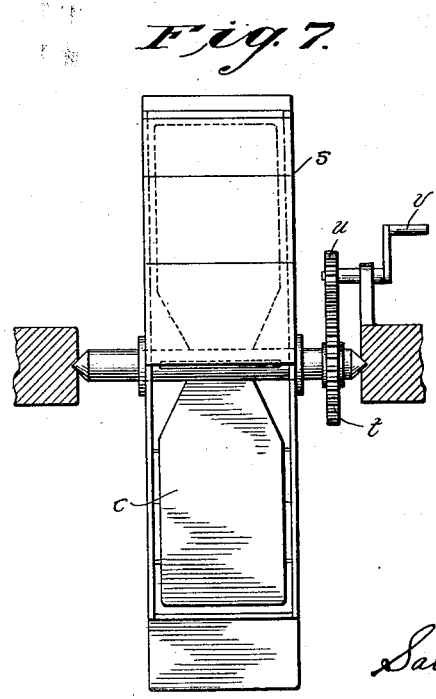
Fig. 7 is a front view of a turnable permeable casing.

Fig. 7 shows a turnable permeable casing —*s*— which can be turned around its axis by means of a gear wheel —*t*— a pinion —*u*— and a handle —*v*—.

It is evident that the turnable permeable casing can be adjusted so that it will turn around its axis by means of any other suitable mechanism.

It should be kept in mind that my invention may be used on ships and other water vehicles, as well as on airships.

It should also be kept in mind that my invention may be used for the utilization of the dynamic forces of air currents, applied to an air rotary mechanism, as in the case of a wind mill.

I claim:

1. In a propeller for aerial vehicles, the combination of a permeable casing having permeable sides and periphery, and movable deflecting vanes on its sides and periphery.

2. In a propeller for aerial vehicles, the combination of a permeable casing with permeable sides and periphery, and movable deflecting vanes on the periphery.

3. In a propeller for aerial vehicles, the combination of a permeable casing with permeable sides and periphery, and movable deflecting vanes on its sides.

4. In a propeller of aerial vehicles, the combination of a permeable casing with permeable sides and periphery, and movable deflecting vanes on one side.

5. In a propeller for aerial vehicles, the combination of a permeable casing with permeable sides and periphery, and movable deflecting vanes on the periphery and on one side.

6. In a propeller for aerial vehicles, the combination of a permeable casing having permeable sides and periphery, the casing being turnable, and movable deflecting vanes on its sides and periphery.

7. In a propeller for aerial vehicles, the combination of a permeable casing with permeable sides and periphery, and deflecting vanes on the periphery, the casing being turnable and the vanes movable.

8. In a propeller for aerial vehicles, the combination of a permeable casing, with permeable sides and periphery, and deflecting vanes on its sides, the casing being turnable and the vanes movable.

9. In a propeller for aerial vehicles, the combination of a permeable casing with permeable sides and periphery, and deflecting vanes on one side, the casing being turnable and the vanes movable.

10. In a propeller for aerial vehicles, the combination of a permeable casing with permeable sides and periphery, and deflecting vanes on the periphery and on one side, the casing being turnable and the vanes movable.

SALUSTIO VALDÉS CORTÉS.